US012779974B2

(12) United States Patent
Zhang et al.

(10) Patent No.: US 12,779,974 B2
(45) Date of Patent: Nov. 3, 2026

(54) HYBRID POWERTRAIN AND VEHICLE

(71) Applicant: BYD COMPANY LIMITED, Shenzhen (CN)

(72) Inventors: Feng Zhang, Shenzhen (CN); Yinsheng Liao, Shenzhen (CN); Gaoming Zhao, Shenzhen (CN); Qiang Wang, Shenzhen (CN); Lijun Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 203 days.

(21) Appl. No.: 18/959,737

(22) Filed: Nov. 26, 2024

(65) Prior Publication Data

US 2025/0083512 A1 Mar. 13, 2025

Related U.S. Application Data

(63) Continuation of application No. PCT/CN2023/097365, filed on May 31, 2023.

(30) Foreign Application Priority Data

May 31, 2022 (CN) ......................... 202221359680.2

(51) Int. Cl.
*B60K 6/387* (2007.10)
*B60K 6/442* (2007.10)

(52) U.S. Cl.
CPC .............. *B60K 6/387* (2013.01); *B60K 6/442* (2013.01)

(58) Field of Classification Search
CPC .......... B60K 6/387; B60K 6/442; B60K 6/52; B60K 6/38; B60K 6/448; B60K 2006/4833
See application file for complete search history.

(56) References Cited

U.S. PATENT DOCUMENTS

2006/0102409 A1* 5/2006 Kamada .................. B60L 50/61 180/249
2020/0016970 A1 1/2020 Lian et al.
2023/0398832 A1* 12/2023 Liu .................... B60H 1/00392

FOREIGN PATENT DOCUMENTS

CN 209159399 U 7/2019
CN 209159400 U 7/2019
CN 209466981 U 10/2019
CN 110667368 U 1/2020

(Continued)

*Primary Examiner* — Timothy Hannon

(74) *Attorney, Agent, or Firm* — Calfee, Halter & Griswold LLP

(57) ABSTRACT

A hybrid powertrain and a vehicle are provided. The hybrid powertrain includes a first electrical machine, an engine, a main shaft, a clutch assembly, a second electrical machine, and a power battery. One end of the main shaft is connected to an output shaft of the engine, and another end of the main shaft is selectively connected to an electrical machine shaft of the first electrical machine through the clutch assembly. The first electrical machine is configured to selectively output power to a first wheel end through the clutch assembly. The second electrical machine includes a rotor and a stator, the rotor is configured to rotate relative to the stator, and the rotor is fixedly connected to the main shaft. The first electrical machine and the second electrical machine are connected to the power battery.

19 Claims, 4 Drawing Sheets

(56) References Cited

FOREIGN PATENT DOCUMENTS

| | | | | | |
|---|---|---|---|---|---|
| CN | 211519252 U | | 9/2020 | | |
| CN | 113978231 A | * | 1/2022 | ............... | B60K 6/38 |
| CN | 114407639 A | * | 4/2022 | ............. | B60K 6/547 |
| CN | 218228631 U | | 1/2023 | | |

* cited by examiner

HYBRID POWERTRAIN AND VEHICLE

CROSS-REFERENCE TO RELATED APPLICATIONS

The present disclosure is a bypass continuation of PCT International Application No. PCT/CN2023/097365, filed on May 31, 2023, which claims priority to Chinese Patent Application No. 202221359680.2, filed on May 31, 2022. The entire contents of the above-referenced applications are incorporated herein by reference.

FIELD

The present disclosure relates to the field of vehicles, and in particular, to a hybrid powertrain and a vehicle.

BACKGROUND

In a related art, a hybrid powertrain of an existing vehicle includes an electrical machine and an engine. The electrical machine and the engine are configured to perform driving. Entire system power retention performance is poor.

SUMMARY

The present disclosure aims to resolve at least one of the technical problems existing in a related art. Therefore, the present disclosure provides a hybrid powertrain with a compact structure, multiple implementable functions, and relatively rich running modes.

A hybrid powertrain in an example of the present disclosure includes: a first electrical machine and an engine; a main shaft, one end of the main shaft being connected to an output shaft of the engine; a clutch assembly, another end of the main shaft being selectively connected to an electrical machine shaft of the first electrical machine through the clutch assembly, and the first electrical machine being configured to selectively output power to a first wheel end through the clutch assembly; a second electrical machine, the second electrical machine including a rotor and a stator, the rotor being configured to rotate relative to the stator, and the rotor being fixedly connected to the main shaft, so that the engine is configured to drive the second electrical machine to generate power; and a power battery, the first electrical machine and the second electrical machine being connected to the power battery.

According to the hybrid powertrain in this example of the present disclosure, a multi-electrical machine combination is arranged, and power is distributed and transferred in the hybrid powertrain by the clutch assembly, to help implement different running modes and enrich driving functions of the hybrid powertrain. In addition, when the engine and the first electrical machine are in a working state, the second electrical machine can generate power when the engine works. In this case, the first electrical machine is configured to perform driving. In this way, a mode of performing driving while generating power is implemented, and power retention performance is relatively good.

According to the hybrid powertrain in some examples of the present disclosure, the clutch assembly includes: a first engagement member and a second engagement member. The first engagement member is arranged on the main shaft, the second engagement member is drivingly connected to the electrical machine shaft of the first electrical machine, the first engagement member and the second engagement member are selectively engaged, and the rotor is fastened to the first engagement member.

According to the hybrid powertrain in some examples of the present disclosure, the hybrid powertrain further includes a first gear and a second gear, the first gear is connected to the first engagement member, the second gear is connected to the rotor, and the first gear is engaged with the second gear.

According to the hybrid powertrain in some examples of the present disclosure, the hybrid powertrain further includes a third gear, the third gear is drivingly connected to the electrical machine shaft of the first electrical machine, and the second engagement member is fixedly connected to the third gear.

According to the hybrid powertrain in some examples of the present disclosure, the hybrid powertrain further includes a support shaft, the third gear is fastened to the support shaft and coaxially arranged with the support shaft, and the first engagement member is rotatably sleeved on the support shaft.

According to the hybrid powertrain in some examples of the present disclosure, the hybrid powertrain further includes a housing, and the clutch assembly and the second electrical machine are arranged inside the housing.

According to the hybrid powertrain in some examples of the present disclosure, the first engagement member is rotatably sleeved on the support shaft through a first bearing, and the support shaft is rotatably connected to the housing through a second bearing.

According to the hybrid powertrain in some examples of the present disclosure, the clutch assembly includes a third engagement member and a fourth engagement member, the third engagement member is drivingly connected to the electrical machine shaft of the first electrical machine, the fourth engagement member is drivingly connected to a differential of the first wheel end, and the third engagement member and the fourth engagement member are selectively engaged.

According to the hybrid powertrain in some examples of the present disclosure, the hybrid powertrain further includes a fifth gear, the fifth gear is fixedly connected to the fourth engagement member, and the fifth gear is connected to an input end of the differential.

According to the hybrid powertrain in some examples of the present disclosure, the hybrid powertrain further includes a fifth gear and a sixth gear, the fifth gear is fixedly connected to the fourth engagement member, the sixth gear is connected to the input end of the differential, the fifth gear is engaged with the sixth gear, and the sixth gear is a reverse gear.

According to the hybrid powertrain in some examples of the present disclosure, the first engagement member and the third engagement member are fixedly connected or integrally formed.

According to the hybrid powertrain in some examples of the present disclosure, the hybrid powertrain further includes a third electrical machine, the third electrical machine is connected to the power battery, and the third electrical machine is configured to output power to a second wheel end.

The present disclosure further provides a vehicle.

The vehicle in this example of the present disclosure includes the hybrid powertrain in any one of the examples of the present disclosure.

The hybrid powertrain of the vehicle has same advantages as those in the related art. Details are not described herein again.

Additional aspects and advantages of the present disclosure are partially given in the following description and are partially become clear from the following description, or may be learned of from practices of the present disclosure.

BRIEF DESCRIPTION OF THE DRAWINGS

The foregoing and/or additional aspects and advantages of the present disclosure become clear and comprehensible in the description of the examples made with reference to the following accompanying drawings.

In the drawings.

Figure 1:
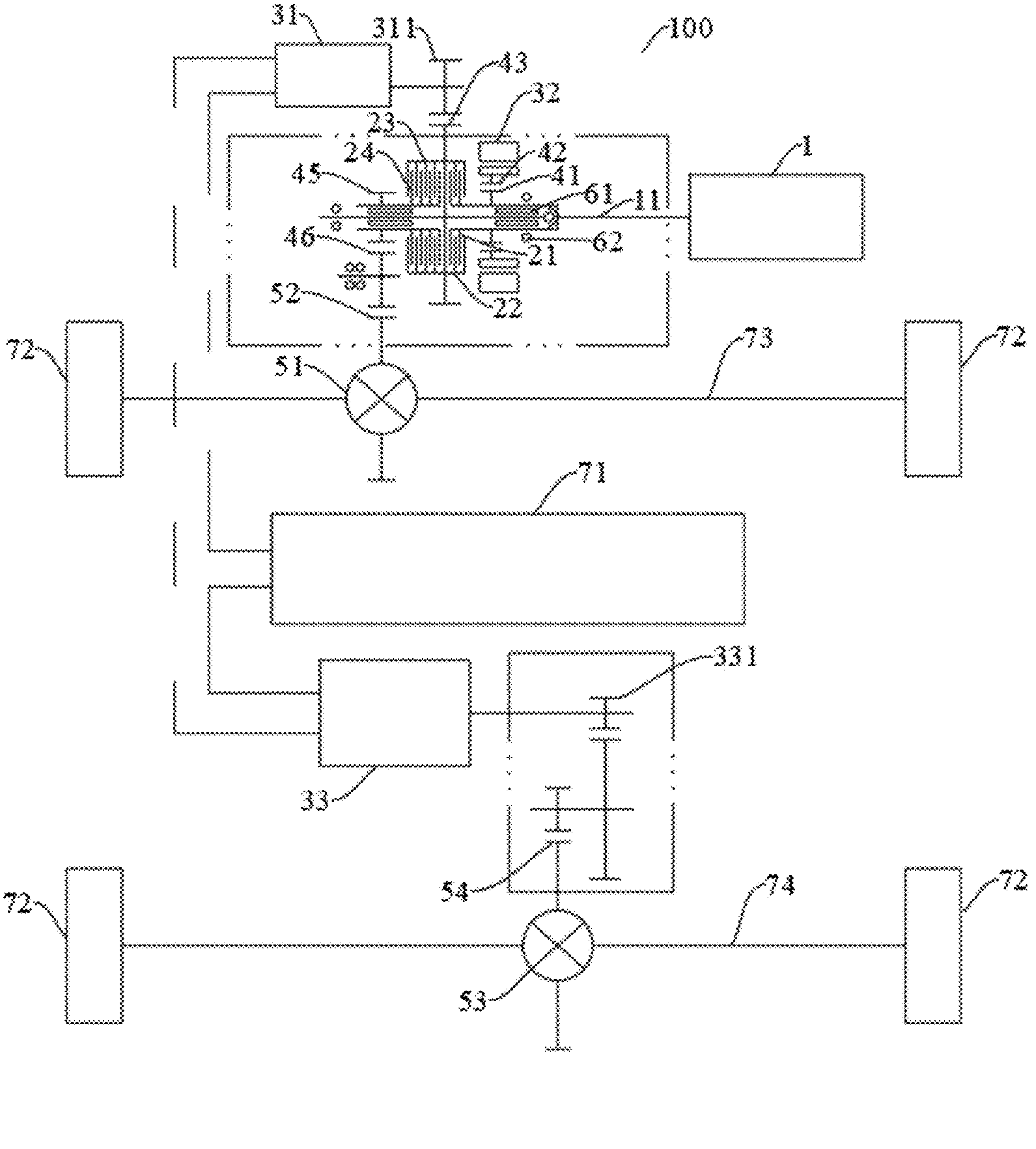
FIG. 1 is a schematic structural diagram of a hybrid powertrain according to some examples of the present disclosure.

Hybrid powertrain 100;

Engine 1, Main shaft 11;

Clutch assembly 2, First engagement member 21, Second engagement member 22, Third engagement member 23, Fourth engagement member 24;

First electrical machine 31, First electrical machine gear 311, Second electrical machine 32, Third electrical machine 33, Second electrical machine gear 331;

First gear 41, Second gear 42, Third gear 43, Fifth gear 45, Sixth gear 46, Reverse shaft 461, Seventh gear 47, Idler gear shaft 471;

Differential 51 of a first wheel end, First output gear 52, Differential 53 of a second wheel end, First drive gear 531, Second drive gear 532, Second output gear 54;

First bearing 61, Second bearing 62, Support shaft 63;

Power battery 71, Wheel 72, Front drive shaft 73, Rear drive shaft 74; and Vehicle 1000.

DETAILED DESCRIPTION

Examples of the present disclosure are described in detail below, and illustrations of the examples are shown in accompanying drawings. Same or similar elements or elements having same or similar functions are denoted by same or similar reference numerals throughout the description. The examples described below with reference to the accompanying drawings are exemplary and used only for explaining the present disclosure, and should not be construed as a limitation on the present disclosure.

In the description of the present disclosure, it should be understood that orientation or position relationships indicated by terms such as “center”, “longitudinal”, “transverse”, “length”, “width”, “thickness”, “on”, “below”, “front”, “back”, “left”, “right”, “vertical”, “horizontal”, “top”, “bottom”, “inside”, “outside”, “clockwise”, “counterclockwise”, “axial direction”, “radial direction”, and “circumferential direction” are based on orientation or position relationships shown in the accompanying drawings, and are used only for ease of describing the present disclosure and simplifying description, rather than indicating or implying that the mentioned apparatus or element need to have a particular orientation or need to be constructed and operated in a particular orientation. Therefore, such terms should not be construed as a limitation on the present disclosure. In addition, a feature defined by “first” or “second” may explicitly or implicitly include one or more features. In the description of the present disclosure, unless otherwise stated, “multiple” means two or more than two.

In the description of the present disclosure, it should be noted that, unless otherwise explicitly specified or defined, the terms such as “mount”, “connect”, and “connection” should be understood in a broad sense. For example, the connection may be a fixed connection, a detachable connection, or an integral connection; or the connection may be a mechanical connection or an electrical connection; or the connection may be a direct connection, an indirect connection through an intermediate medium, or internal communication between two elements. A person of ordinary skill in the art may understand the specific meanings of the foregoing terms in the present disclosure based on specific situations.

With reference to FIG. 1 to FIG. 4, the following describes a hybrid powertrain 100 in an example of the present disclosure. The hybrid powertrain 100 has a compact structure design, multiple implementable functions, and relatively rich running modes. In addition, a second electrical machine 32 may separately generate power, and a system power retention capability is strong. The hybrid powertrain 100 may be mounted on a vehicle 1000.

As shown in FIG. 1 to FIG. 4, the hybrid powertrain 100 in this example of the present disclosure includes a first electrical machine 31, an engine 1, a main shaft 11, a clutch assembly 2, the second electrical machine 32, and a power battery 71.

The first electrical machine 31 and the engine 1 separately and/or simultaneously provide driving forces for the hybrid powertrain 100. For example, the first electrical machine 31 separately provides a driving force to implement pure electrical driving, or the engine 1 separately provides a driving force to implement fuel driving, or the first electrical machine 31 and the engine 1 simultaneously provide the driving forces to implement hybrid driving. Therefore, the hybrid powertrain 100 may have at least three running modes.

One end of the main shaft 11 is connected to an output shaft of the engine 1. For example, the output shaft of the engine 1 is fixedly connected to an end portion of the main shaft 11, so that the output shaft of the engine 1 and the end portion of the main shaft 11 synchronously rotate, and further, the driving force of the engine 1 is output to another component in the hybrid powertrain 100 through the main shaft 11. Another end of the main shaft 11 is selectively connected to an electrical machine shaft of the first electrical machine 31 through the clutch assembly 2. To be specific, a state of the clutch assembly 2 may be switched, so that another end of the main shaft 11 is disconnected from or connected to the electrical machine shaft of the first electrical machine 31, and the driving force output by the engine 1 is transferred to the first electrical machine 31 through the clutch assembly 2, or the driving force output by the engine 1 is output to another component. The first electrical machine 31 is configured to selectively output power to a first wheel end through the clutch assembly 2. To be specific, a driving force carried on the clutch assembly 2 may be transferred to the first wheel end, and the clutch assembly 2 may not only transmit, to the first wheel end, the driving force output by the engine 1, but also transmit, to the first wheel end, power output by the first electrical machine 31.

In other words, the clutch assembly 2 not only may be configured to output, to the first wheel end, the driving force output by the engine 1, but also may output, to the first wheel end, the driving force output by the first electrical machine 31, and may implement power transmission between the engine 1 and the first electrical machine 31. That is, the first electrical machine 31 is configured as a motor generator with driving and power generation functions, so that the hybrid powertrain 100 has multiple function modes. The first wheel end may be a front wheel 72, or may be a rear wheel 72, so that the vehicle 1000 mounted with the hybrid powertrain 100 can be a front-wheel drive vehicle or a rear-wheel drive vehicle.

The second electrical machine 32 includes a rotor and a stator, and the rotor is configured to rotate relative to the stator, to implement a power generation function of the second electrical machine 32 when the rotor is configured to rotate relative to the stator. That is, the second electrical machine 32 is configured as a generator. In addition, the rotor is fixedly connected to the main shaft 11, so that the main shaft 11 can drive the rotor to rotate circumferentially. Further, when the engine 1 runs, the main shaft 11 may drive the rotor to rotate, so that the rotor is configured to rotate relative to the stator, to implement a power generation function, so that the hybrid powertrain has a power retention mode. Therefore, the first electrical machine 31 and the second electrical machine 32 may be configured to generate power. To be specific, the engine 1 may be configured to separately drive the first electrical machine 31 to generate power, or may be configured to separately drive the second electrical machine 32 to generate power, or may be configured to drive the first electrical machine 31 and the second electrical machine 32 to generate power. When the three generator modes are executed, the engine 1 may further has a function of driving the vehicle 1000 to run. Therefore, a quantity of function modes of the vehicle 1000 is increased, and a running mode is optimized. In addition, when the engine and the first electrical machine are in a working state, the second electrical machine can generate power when the engine works. In this case, the first electrical machine is configured to perform driving. In this way, a mode of performing driving while generating power is implemented, and power retention performance is relatively good.

The rotor of the second electrical machine 32 is fixedly mounted on the main shaft 11 connected to the engine 1, so that a power generation function of the second electrical machine 32 can be implemented without requiring the driving force output by the engine 1 to pass through the clutch assembly 2 in a process in which the second electrical machine 32 generates power, to shorten a power path when the second electrical machine 32 generates power, optimize a power generation mode, improve power generation efficiency, and further improve a system power retention capability of the hybrid powertrain 100.

The first electrical machine 31 and the second electrical machine 32 are connected to the power battery 71. In the present disclosure, the first electrical machine 31 is configured as a motor generator, the first electrical machine 31 may output generated electrical energy to the power battery 71 for storage, and electrical energy in the power battery 71 may be output to the first electrical machine 31 to drive the vehicle 1000. In addition, the second electrical machine 32 is configured as an ISG electrical machine, so that electrical energy generated by the second electrical machine 32 can be output to the power battery 71 for storage. That is, no battery needs to be separately arranged for the first electrical machine 31 and the second electrical machine 32, to reduce arrangement costs.

According to the hybrid powertrain 100 in this example of the present disclosure, a multi-electrical machine combination is arranged, and power is distributed and transferred in the hybrid powertrain 100 by the clutch assembly 2, to help implement different running modes and enrich driving functions of the hybrid powertrain 100. In addition, the second electrical machine 32 has relatively high power generation efficiency, to improve power generation performance, and improve power retention performance.

In some examples, the clutch assembly 2 includes a first engagement member 21 and a second engagement member 22.

The first engagement member 21 is arranged on the main shaft 11. In other words, the main shaft 11 may transfer power to the first engagement member 21. In addition, the second engagement member 22 is drivingly connected to the electrical machine shaft of the first electrical machine 31. In other words, power of the second engagement member 22 may be transferred to the electrical machine shaft of the first electrical machine 31. The first engagement member 21 and the second engagement member 22 are selectively engaged.

To be specific, when the first electrical machine 31 is configured to perform a power generation function, the first engagement member 21 and the second engagement member 22 may be engaged, so that power output by the engine 1 to the main shaft 11 can be transferred to the first engagement member 21. The first engagement member 21 and the second engagement member 22 are engaged to transfer a driving force to the second engagement member 22, to implement driving of the electrical machine shaft of the first electrical machine 31, and further drive the first electrical machine 31 to generate power.

The rotor is fastened to the first engagement member 21. To be specific, the rotor may be directly fixedly connected to the first engagement member 21, or the rotor is relatively fastened to the first engagement member 21, so that the rotor can be configured to rotate synchronously with the first engagement member 21. In this solution, the rotor is fastened to the first engagement member 21, and the clutch assembly and the second electrical machine are integrated to an extent, to simplify an entire structure.

For example, in actual mounting, an end portion of the first engagement member 21 and the end portion of the main shaft 11 may be integrated into an integral structure, the rotor is sleeved outside the first engagement member 21, and an inner peripheral wall of the rotor and an outer peripheral wall of the first engagement member 21 are matched through a spline or are in a power connection through another structure, so that a driving force of the first engagement member 21 can be transferred to the rotor, to drive the rotor to rotate relative to the stator, and implement the power generation function of the second electrical machine 32.

Therefore, matching of the first engagement member 21 and the second engagement member 22 is set, to help implement a power generation function of the first electrical machine 31 and the second electrical machine 32. In this case, a structure is simple, a power transfer path is short, and running efficiency is improved.

In some examples, the main shaft 11 may also be an output shaft of the engine.

In some examples, the hybrid powertrain 100 further includes a first gear 41 and a second gear 42, the first gear 41 is connected to the first engagement member 21, the second gear 42 is connected to the rotor, and the first gear 41 is engaged with the second gear 42, so that the first engagement member 21 and the rotor are drivingly matched through a gear set.

As shown in FIG. 1, the first gear 41 is fixedly sleeved outside the first engagement member 21, and the second gear 42 is fixedly mounted inside the rotor, so that the outer peripheral wall of the first engagement member 21 and the inner peripheral wall of the rotor are drivingly matched through the first gear 41 and the second gear 42. Therefore, the driving force output by the engine 1 may be transferred to the first engagement member 21 through the main shaft 11, and further, is transferred to the rotor sequentially by the first engagement member 21, the first gear 41, and the second gear 42, so that power is drivingly transferred. A matching size of the first gear 41 and the second gear 42 may be adjusted, to change a transmission ratio from the first engagement member 21 to the second engagement member 22.

In some examples, the hybrid powertrain 100 further includes a third gear 43, the third gear 43 is drivingly connected to the electrical machine shaft of the first electrical machine 31, and the second engagement member 22 is fixedly connected to the third gear 43, so that the second engagement member 22 can transmit the driving force of the engine 1 to the electrical machine shaft of the first electrical machine 31 through the third gear 43, to drive the first electrical machine 31 to generate power. Alternatively, the driving force of the first electrical machine 31 may be output to the third gear 43, to transfer the driving force to the clutch assembly 2, so that power is output.

In an actual design, a first electrical machine gear 311 may be fixedly arranged on the electrical machine shaft of the first electrical machine 31, and the first electrical machine gear 311 is engaged with the third gear 43, so that the electrical machine shaft and the second engagement member 22 are matched through engagement between the first electrical machine gear 311 and the third gear 43, to implement a power transfer.

In some examples, the hybrid powertrain 100 further includes a support shaft 63, the third gear 43 is fastened to the support shaft 63, and the third gear 43 is coaxially arranged with the support shaft 63. For example, the third gear 43 is integrated into an outer peripheral wall of the support shaft 63, so that in a rotation process, the first gear 41 can drive the support shaft 63 to rotate. In other words, the second engagement member 22 may rotate synchronously with the support shaft 63.

The first engagement member 21 is rotatably sleeved on the support shaft 63. To be specific, in actual mounting, one end of the first engagement member 21 may be fixedly connected to the end portion of the main shaft 11, and the other end of the first engagement member 21 is sleeved on the support shaft 63 to rotate relative to the support shaft 63. In addition, when the first engagement member 21 is engaged with the second engagement member 22, the first engagement member 21 rotates synchronously with the support shaft 63. In other words, when the first electrical machine 31 is configured to generate power, the first engagement member 21 and the second engagement member 22 are engaged and fastened, the driving force of the engine 1 may be transferred to the first engagement member 21 through the main shaft 11, the first engagement member 21 transfers power to the second engagement member 22, the second engagement member 22 transfers power to the support shaft 63, and the support shaft 63 drives the third gear 43 to rotate, to further drive the electrical machine shaft of the first electrical machine 31 to rotate, so that power is generated and power is transferred.

In an actual design, the second engagement member 22 may be fixedly mounted on the support shaft 63, so that the second engagement member 22 moves with the support shaft 63.

In some examples, the hybrid powertrain 100 further includes a housing, and the clutch assembly 2 and the second electrical machine 32 are arranged inside the housing. As shown in FIG. 1, the clutch assembly 2 and the second electrical machine 32 are integrated and mounted inside the housing. In addition, the main shaft 11 penetrates through the housing to be connected to the first engagement member 21, and at least a part of the third gear 43 protrudes from the housing to be in a power connection to the electrical machine shaft of the first electrical machine 31.

Therefore, the clutch assembly 2 and the second electrical machine 32 are integrated inside the housing, to help provide a stable mounting environment for the clutch assembly 2 and the second electrical machine 32, and ensure that the clutch assembly 2 can accurately and reliably switch a power connection path. The clutch assembly 2 and the second electrical machine 32 are integrated inside the housing, and does not need to separately occupy mounting space, to help reduce mounting difficulty.

In some examples, the first engagement member 21 is rotatably sleeved on the support shaft 63 through a first bearing 61. For example, the first bearing 61 is arranged between an inner peripheral wall of the first engagement member 21 and the outer peripheral wall of the support shaft 63, so that the first engagement member 21 can rotate more smoothly relative to the support shaft 63, to help smoothly output the driving force of the engine 1.

The support shaft 63 is rotatably connected to the housing through a second bearing 62. For example, the second bearing 62 is arranged on the outer peripheral wall of the support shaft 63, an inner race of the second bearing 62 is fixedly connected to the support shaft 63, and an outer race of the second bearing 62 is fastened to an inner peripheral wall of the housing, so that the support shaft 63 can smoothly rotate relative to the housing.

Therefore, the first bearing 61 and the second bearing 62 are arranged, to help improve rotation efficiency of a rotating member, reduce a friction loss, and improve running efficiency of the hybrid powertrain 100.

In some examples, the clutch assembly 2 includes a third engagement member 23 and a fourth engagement member 24, and the third engagement member 23 and the fourth engagement member 24 are matched, and are configured to transfer power between the first electrical machine 31 and a differential 51 of the first wheel end.

In some examples, the third engagement member 23 is drivingly connected to the electrical machine shaft of the first electrical machine 31. For example, the third engagement member 23 and the electrical machine shaft of the first electrical machine 31 are drivingly matched through a gear set. In addition, the fourth engagement member 24 is drivingly connected to the differential 51 of the first wheel end. For example, the fourth engagement member 24 may be drivingly connected to the differential 51 of the first wheel end through a gear set. The third engagement member 23 and the fourth engagement member 24 are selectively engaged.

Therefore, when the third engagement member 23 and the fourth engagement member 24 are in an engaged state, the driving force output by the first electrical machine 31 may be transferred to the fourth engagement member 24 through the third engagement member 23, and further output to the differential 51 of the first wheel end, so that power is output, to drive the vehicle 1000 to drive. In this way, a pure electrical or hybrid driving mode in which the first electrical machine 31 is an output member can be implemented.

In some examples, the hybrid powertrain 100 further includes a fifth gear 45, the fifth gear 45 is fixedly connected to the fourth engagement member 24, and the fifth gear 45 is connected to an input end of the differential. In addition, in an actual design, a first output gear 52 may be arranged at the input end of the differential, so that the first output gear 52 is engaged with the fifth gear 45, to further output the driving force of the fourth engagement member 24 to the differential 51 of the first wheel end sequentially through the fifth gear 45 and the first output gear 52, so that power is output.

Alternatively, in some other examples, the hybrid powertrain 100 further includes a fifth gear 45 and a sixth gear 46, the fifth gear 45 is fixedly connected to the fourth engagement member 24, the sixth gear 46 is connected to an input end of the differential, and the fifth gear 45 is engaged with the sixth gear 46. In addition, in an actual design, a first output gear 52 may be arranged at the input end of the differential, so that the first output gear 52 is engaged with the sixth gear 46, to further output a driving force of the fourth engagement member 24 to the differential 51 of the first wheel end, so that power is output.

That is, the driving force of the fourth engagement member 24 may be output to the differential 51 of the first wheel end sequentially through the fifth gear 45, the sixth gear 46, and the first output gear 52, so that power is output. The fifth gear 45 and the fourth engagement member 24 are arranged in an integrated manner, so that the fifth gear 45 can rotate synchronously with the fourth engagement member 24 in a same direction. In addition, the sixth gear 46 is engaged with the fifth gear 45, so that a rotation direction of the sixth gear 46 is opposite to a rotation direction of the fifth gear 45. In other words, the sixth gear 46 is configured as a reverse gear, so that a force is transferred in different directions. The reverse gear is rotatably mounted inside the housing through the reserve shaft 461.

In some examples, the first engagement member 21 and the third engagement member 23 are fixedly connected or integrally formed. For example, the first engagement member 21 and the third engagement member 23 are fixedly connected, or the first engagement member 21 and the third engagement member 23 are arranged as an integral structure, so that the first engagement member 21 and the third engagement member 23 can synchronously rotate in a process in which the hybrid powertrain 100 runs.

The first engagement member 21 and the third engagement member 23 are integrally fastened, so that power between the first engagement member 21 and the third engagement member 23 can be transferred to each other. For example, the first engagement member 21 is in a power connection to the engine 1, so that the driving force of the engine 1 can be transferred to the third engagement member 23 through the first engagement member 21. Further, when the third engagement member 23 and the fourth engagement member 24 are engaged, the driving force of the engine 1 can be transferred to the fourth engagement member 24 through the third engagement member 23 and output to the differential 51 of the first wheel end. In addition, the driving force of the first electrical machine 31 can also be transferred to the fourth engagement member 24 through the third engagement member 23 and output to the differential 51 of the first wheel end.

When the first engagement member 21 and the second engagement member 22 are engaged, the driving force of the engine 1 may be transferred to the second engagement member 22 through the first engagement member 21, to implement a power generation function of the first electrical machine 31. In addition, the driving force on the engine 1 may also be transferred to the fourth engagement member 24 through the third engagement member 23, so that the fourth engagement member 24 outputs the driving force to the differential 51 of the first wheel end.

In this way, it is conducive to reduce a quantity of connecting members between two groups of clutch structures and reduce arrangement costs.

In some examples, the hybrid powertrain 100 further includes a third electrical machine 33, the third electrical machine 33 is connected to the power battery 71, and the third electrical machine 33 is configured to output power to a second wheel end. In other words, in the present disclosure, power not only may be output through the first electrical machine 31 and the engine 1, but also may be output through the third electrical machine 33, to greatly enrich driving modes of the vehicle 1000.

In some examples, one of the second wheel end and the first wheel end is the front wheel 72, and the other one is the rear wheel 72. For example, the first wheel end is arranged as the front wheel 72, so that the engine 1 and/or the first electrical machine 31 are/is configured to drive the front wheel 72 to rotate, to implement front-wheel driving of the vehicle 1000. In addition, the second wheel end is arranged as the rear wheel 72, so that the third electrical machine 33 is configured to drive the rear wheel 72 to rotate, to further implement four-wheel driving of the vehicle 1000.

In some examples, as shown in FIG. 1, in actual arrangement, the engine 1 may be arranged on a right side of the vehicle 1000, a transmission of the first wheel end is arranged on a left side of the vehicle 1000, and the first electrical machine 31 is arranged on a front left side of the vehicle 1000. The first engagement member 21 and the second engagement member 22 are located on a left side of the clutch assembly 2, and the third engagement member 23 and the fourth engagement member 24 are arranged on a right side of the clutch assembly 2.

Figure 2:
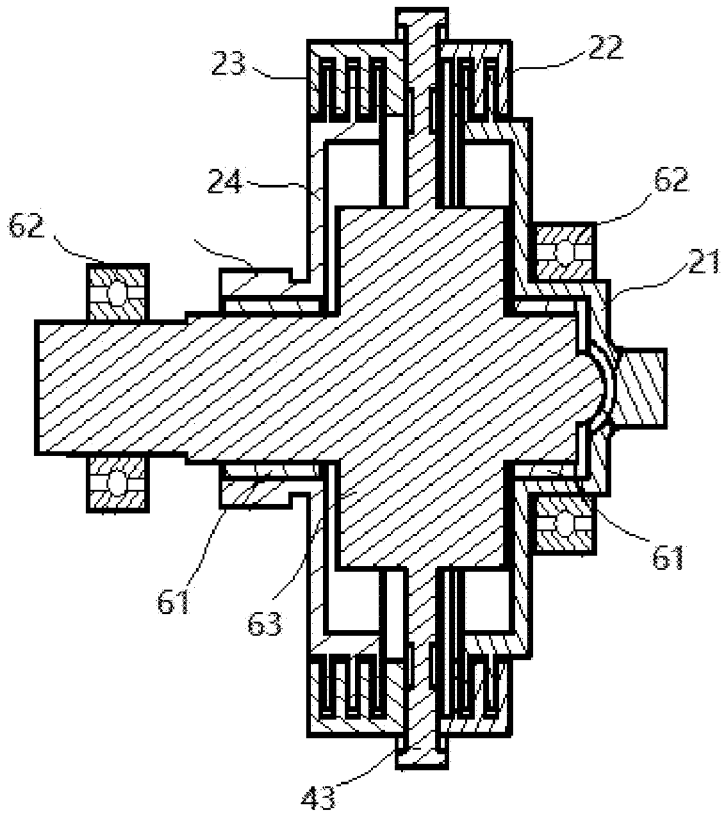
FIG. 2 is a locally enlarged diagram of a hybrid powertrain according to some examples of the present disclosure.

As shown in FIG. 2, a spherical limiting projection may be arranged at an end portion of the support shaft 63, and a spherical limiting groove is formed on a left side inside the first engagement member 21, to perform concentric arrangement through the spherical limiting projection and the spherical limiting groove. A specific design gap is reserved between the support shaft 63 and the first engagement member 21, to further perform limiting protection on the support shaft 63 when a relatively large axial force is imposed on the support shaft 63, and prevent the support shaft 63 from axially move abnormally.

Figure 3:
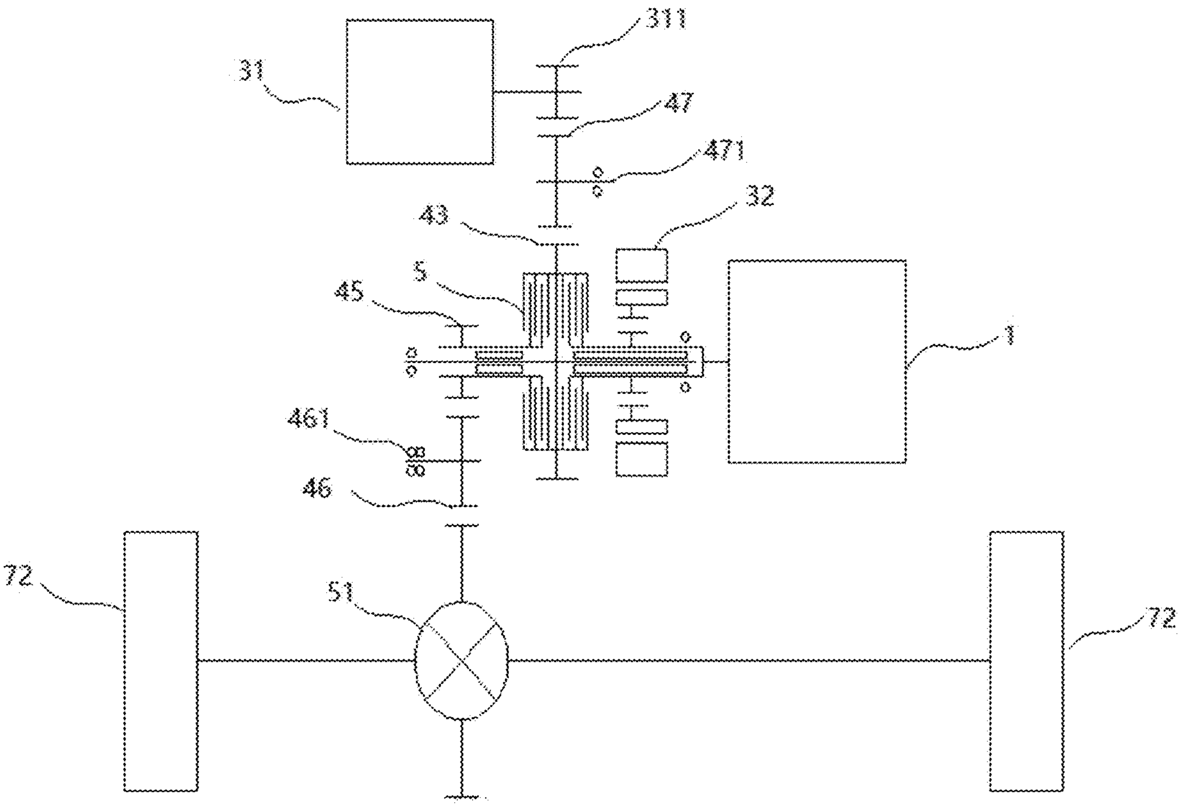
FIG. 3 is a schematic structural diagram of a hybrid powertrain according to some other examples of the present disclosure.

As shown in FIG. 3, in some other examples, the first electrical machine 31 is located on a front side of the vehicle 1000, the engine 1 and a transmission of the first wheel end are located at a position on a rear portion of the first electrical machine 31, a seventh gear 47 is arranged between the first electrical machine gear 311 of the first electrical machine 31 and the third gear 43, and the seventh gear 47 is idly sleeved on a vehicle body through an idler gear shaft 471.

Figure 4:
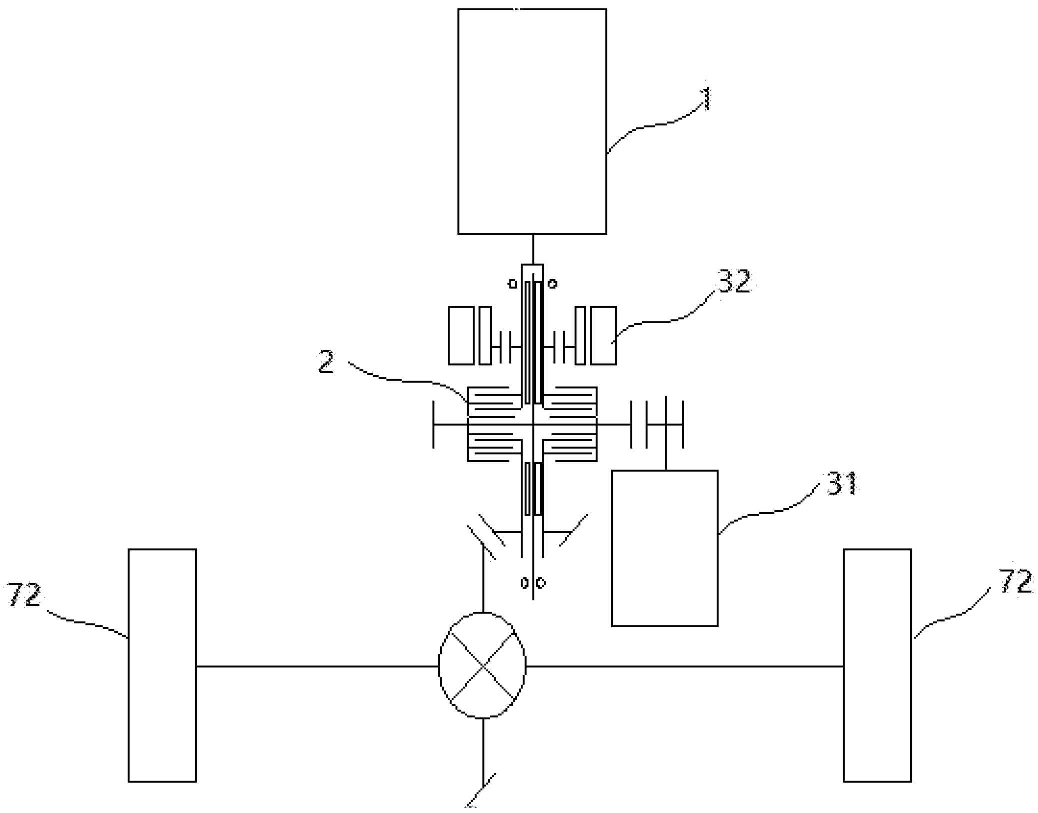
FIG. 4 is a schematic structural diagram of a hybrid powertrain according to still some other examples of the present disclosure.

Alternatively, as shown in FIG. 4, the engine 1 is arranged on a front side of a transmission of the first wheel end, and the first electrical machine 31 is located on a rear side of the transmission of the first wheel end.

The following describes a hybrid powertrain 100 in some examples of the present disclosure with reference to FIG. 1 and FIG. 2. As shown in FIG. 1, the hybrid powertrain 100 includes a first electrical machine 31, an engine 1, a main shaft 11, a clutch assembly 2, a second electrical machine 32, a power battery 71, and a third electrical machine 33. The clutch assembly 2 includes a first engagement member 21, a second engagement member 22, a third engagement member 23, and a fourth engagement member 24, and the clutch assembly 2 and the second electrical machine 32 are mounted inside a housing.

An output end of the engine 1 is connected to the main shaft 11, the main shaft 11 is connected to the first engagement member 21, a rotor of the second electrical machine 32 is connected to a second gear 42, a first gear 41 is arranged outside the first engagement member 21, the first gear 41 is engaged with a second gear 42, and the rotor is rotatably mounted inside a stator, so that the second electrical machine 32 generates power. The main shaft 11 is fixedly connected to the first engagement member 21, the first engagement member 21 and the second engagement member 22 are matched, the second engagement member 22 is fixedly connected to a third gear 43, and the third gear 43 is configured to be drivingly connected to an electrical machine shaft of the first electrical machine 31. The third gear 43 is fastened to a support shaft 63, the second engagement member 22 is fixedly connected to the support shaft 63, and the first engagement member 21 is rotatably sleeved on the support shaft 63, so that the first engagement member 21 and the second engagement member 22 are selectively engaged.

As shown in FIG. 1, the third engagement member 23 and the fourth engagement member 24 are matched, the third engagement member 23 is in a power connection to the electrical machine shaft of the first electrical machine 31, the fourth engagement member 24 is drivingly connected to a differential 51 of the first wheel end, the fourth engagement member 24 is fixedly connected to the fifth gear 45, a first output gear 52 is arranged at an input end of the differential, the first output gear 52 is engaged with a sixth gear 46, and the sixth gear 46 is engaged with the fifth gear 45.

The third electrical machine 33, the second electrical machine 32, and the first electrical machine 31 are all connected to the power battery 71, and the third electrical machine 33 is in a power connection to a second wheel end. For example, the third electrical machine 33 and a differential 53 of the second wheel end are in a power connection. An electrical machine shaft of the third electrical machine 33 is arranged with a second electrical machine gear 331, a second output gear 54 is arranged on the differential 53 of the second wheel end, and a first drive gear 531 and a second drive gear 532 are arranged between the second electrical machine gear 331 and the second output gear 54 for driving, so that power is output. The first wheel end may be a front wheel 72, and the second wheel end may be a rear wheel 72.

The hybrid powertrain 100 in this example of the present disclosure has the following multiple working modes:

Function of starting the engine 1 when a front electrical machine is in a no-load state: In such a function state, the fourth engagement member 24 and the third engagement member 23 are disconnected, and the front electrical machine is in a still state. The power battery 71 starts to supply power to the front electrical machine, the first electrical machine 31 starts to run from a still state, then the first engagement member 21 is engaged with the third engagement member 23, and power is transferred to the engine 1 through a first electrical machine gear 311, the third gear 43, the third engagement member 23, the first engagement member 21, and the main shaft 11 of the first engagement member 21, to drag the first engagement member 21 to start ignition.

Function of starting the engine 1 when a front electrical machine is in a loading state: In such a function state, the fourth engagement member 24 has been engaged with the third engagement member 23, the power battery 71 supplies power to the first electrical machine 31, and the first electrical machine 31 is in a running with load state. The first engagement member 21 starts to be engaged with the third engagement member 23 through sliding friction, and power is transferred to the engine 1 through the first engagement member 21 and the main shaft 11 of the first engagement member 21, to drag the engine 1 to start ignition.

Series power generation function of the engine 1: In such a function state, the engine 1 has been in an ignited, running, and working state, and the fourth engagement member 24 is disconnected from the third engagement member 23. The first engagement member 21 starts to be engaged with the third engagement member 23, the engine 1 transfers power to the first electrical machine 31 through the first engagement member 21, the main shaft 11 of the first engagement member 21, the third engagement member 23, the third gear 43, and the first electrical machine gear 311, and the first electrical machine 31 runs to generate power and supply electrical energy to the power battery 71 or the third electrical machine 33.

Parallel power generation function of the engine 1: In such a function state, the engine 1 is in an ignited, running, and working state, the first engagement member 21 is engaged with the third engagement member 23, the fourth engagement member 24 is engaged with the third engagement member 23, and the engine 1 drives the vehicle 1000 to run and drags the first electrical machine 31 to rotate. The first electrical machine 31 changes into a generator mode, and the engine 1 drives the first electrical machine 31 to generate power and supply electrical energy to the power battery 71 or the third electrical machine 33.

Function of recovering braking energy by a rear electrical machine during driving: In such a function state, the fourth engagement member 24 is disconnected from the third engagement member 23, and the first engagement member 21 is disconnected from the third engagement member 23. The vehicle 1000 transfers power to the third electrical machine 33 through a rear drive shaft 74, the differential 53 of the second wheel end, and a transmission of the second wheel end, and the third electrical machine 33 runs to generate power and supply electrical energy to the power battery 71 or the first electrical machine 31. The function is applicable to small and medium braking conditions.

Function of jointly recovering braking energy by a front electrical machine and a rear electrical machine during driving: In such a function state, the fourth engagement member 24 is engaged from the third engagement member 23, and the first engagement member 21 is disconnected from the third engagement member 23. The vehicle 1000 transfers power to the third electrical machine 33 through a rear drive shaft 74, the differential 53 of the second wheel end, and a transmission of the second wheel end, and also transfers power to the first electrical machine 31 through a front drive shaft 73, the differential 51 of the first wheel end, and a front transmission 3, and the third electrical machine 33 and the first electrical machine 31 run together to generate power and supply electrical energy to the power battery 71. The function is applicable to medium and large braking conditions.

EV front-wheel drive mode: In the mode, the third engagement member 23 is engaged with the fourth engagement member 24, and the first engagement member 21 is disconnected from the second engagement member 22. The power battery 71 supplies power to the first electrical machine 31, and the first electrical machine 31 runs and transfers power to a wheel 72 through a first electrical machine gear 311, the third gear 43, the third engagement member 23, the fourth engagement member 24, the fifth gear 45, the sixth gear 46, the first output gear 52, the differential 51 of the first wheel end, and a front drive shaft 73, to drag the entire vehicle to run.

EV rear-wheel drive mode: In the mode, the fourth engagement member 24 is disconnected from the third engagement member 23, and the first engagement member 21 is disconnected from the third engagement member 23. The power battery 71 supplies power to the third electrical machine 33, and the third electrical machine 33 runs and transfers power to a wheel 72 through a transmission of the second wheel end, the differential 53 of the second wheel end, and a rear drive shaft 74, to drag the entire vehicle to run.

EV four-wheel drive mode 1 (normal condition): In the mode, the fourth engagement member 24 is engaged with the third engagement member 23, and the first engagement member 21 is disconnected from the third engagement member 23. The power battery 71 supplies power to the first electrical machine 31, and the first electrical machine 31 runs and transfers power to a wheel 72 through a first electrical machine gear 311, the third gear 43, the third engagement member 23, the fourth engagement member 24, the fifth gear 45, the sixth gear 46, the first output gear 52, the differential 51 of the first wheel end, and a front drive shaft 73. The power battery 71 also supplies power to the third electrical machine 33, and the third electrical machine 33 runs and transfers power to a wheel 72 through a transmission of the second wheel end, the differential 53 of the second wheel end, and a rear drive shaft 74. A front electrical machine and a rear electrical machine work together to drag the entire vehicle to run.

EV four-wheel drive mode 2 (power retention condition): In the mode, the fourth engagement member 24 is engaged with the third engagement member 23, and the first engagement member 21 is disconnected from the third engagement member 23. The power battery 71 supplies power to the first electrical machine 31, and the first electrical machine 31 runs and transfers power to a wheel 72 through a first electrical machine gear 311, the third gear 43, the third engagement member 23, the fourth engagement member 24, the fifth gear 45, the sixth gear 46, the first output gear 52, the differential 51 of the first wheel end, and a front drive shaft 73. The power battery 71 also supplies power to the third electrical machine 33, and the third electrical machine 33 runs and transfers power to a wheel 72 through a transmission of the second wheel end, the differential 53 of the second wheel end, and a rear drive shaft 74. A front electrical machine and a rear electrical machine work together to drag the entire vehicle to run. In addition, the engine 1 is in a working state, and drives, through a right clutch driven assembly of the main shaft 11, the first engagement member 21, the first gear 41, and the second gear 42, the second electrical machine 32 to generate power, to supply electrical energy to the first electrical machine 31 or the third electrical machine 33, thereby reducing discharge output of the power battery 71.

HEV front-wheel drive mode: In the mode, the engine 1 is in an ignited, running, and working state, the fourth engagement member 24 is engaged with the third engagement member 23, and the first engagement member 21 is engaged with the third engagement member 23. The engine 1 transfers power to a wheel 72 through the first engagement member 21, the main shaft 11 of the first engagement member 21, the third engagement member 23, the fourth engagement member 24, the fifth gear 45, the sixth gear 46, the first output gear 52, the differential 51 of the first wheel end, and a front drive shaft 73, to drag the entire vehicle to run. When power is insufficient, the power battery 71 supplies power to the first electrical machine 31, to help the engine 1 to drive the entire vehicle. When the power is surplus, the first electrical machine 31 generates power and supplies electrical energy to the power battery 71.

HEV rear-wheel drive mode: In the mode, the engine 1 is in an ignited, running, and working state, the fourth engagement member 24 is disconnected from the third engagement member 23, and the first engagement member 21 is engaged with the third engagement member 23. The engine 1 transfers power to the first electrical machine 31 through the first engagement member 21, the main shaft 11 of the first engagement member 21, the third engagement member 23, the third gear 43, and the first electrical machine gear 311, and the first electrical machine 31 and the second electrical machine 32 run to generate power and supply electrical energy to the third electrical machine 33. The third electrical machine 33 runs and transfers power to a wheel 72 through a transmission of the second wheel end, the differential 53 of the second wheel end, and a rear drive shaft 74, to drag the entire vehicle to run. When power is insufficient, the power battery 71 recharges the third electrical machine 33, to help drive the entire vehicle. When the power is surplus, the first electrical machine 31 supplies extra electrical energy to the power battery 71.

HEV four-wheel drive mode: In the mode, the engine 1 is in an ignited, running, and working state, the fourth engagement member 24 is engaged with the third engagement member 23, and the first engagement member 21 is engaged with the third engagement member 23. The engine 1 transfers power to a wheel 72 through the first engagement member 21, the main shaft 11 of the first engagement member 21, the third engagement member 23, the fourth engagement member 24, the fifth gear 45, the sixth gear 46, the first output gear 52, the differential 51 of the first wheel end, and a front drive shaft 73, to drag the entire vehicle to run. In addition, the power battery 71 supplies power to the third electrical machine 33, and the third electrical machine 33 runs and transfers power to a wheel 72 through a transmission of the second wheel end, the differential 53 of the second wheel end, and a rear drive shaft 74, to drag the entire vehicle together to run. When power is insufficient, the power battery 71 supplies power to the first electrical machine 31, to help drive the entire vehicle. When the power is surplus, the first electrical machine 31 generates power and supplies electrical energy to the power battery 71.

The present disclosure further discloses a vehicle 1000.

Figure 5:
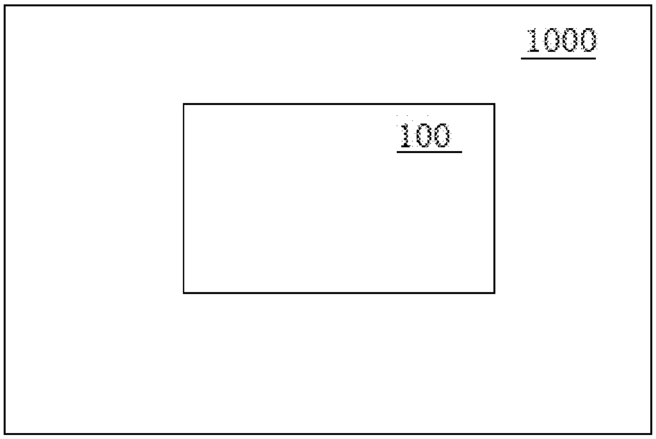
FIG. 5 is a schematic structural diagram of a vehicle according to an example of the present disclosure.

As shown in FIG. 5, the vehicle 1000 in this example of the present disclosure includes the hybrid powertrain 100 described in any one of the foregoing examples. The hybrid powertrain 100 is arranged, a multi-electrical machine combination is arranged, and power is distributed and transferred in the hybrid powertrain 100 by a clutch assembly 2, to help implement different running modes and enrich driving functions of the hybrid powertrain 100. In addition, a second electrical machine 32 has relatively high power generation efficiency, to improve power generation performance, and optimize performance of the entire vehicle.

In the description of this specification, descriptions of reference terms “an embodiment”, “some embodiments”, “an example embodiment”, “an example”, “a specific example”, or “some examples” mean that specific features, structures, materials, or features described with reference to the embodiment or example are included in at least one embodiment or example of the present disclosure. In this specification, example descriptions of the foregoing terms do not necessarily indicate the same embodiment or example. In addition, the described specific features, structures, materials, or features may be combined in a proper manner in any one or more embodiments or examples.

Although the examples of the present disclosure are shown and described, a person of ordinary skill in the art should understand that various changes, modifications, replacements, and variations may be made to the examples without departing from the principles and spirit of the present disclosure, and the scope of the present disclosure is defined by the claims and equivalents thereof.

What is claimed is:

1. A hybrid powertrain, comprising:

a first electrical machine and an engine;

a main shaft, one end of the main shaft being connected to an output shaft of the engine;

a clutch assembly, another end of the main shaft being selectively connected to an electrical machine shaft of the first electrical machine through the clutch assembly, and the first electrical machine being configured to selectively output power to a first wheel end through the clutch assembly;

a second electrical machine, the second electrical machine comprising a rotor and a stator, the rotor being configured to rotate relative to the stator, and the rotor being fixedly connected to the main shaft, so that the engine is configured to drive the second electrical machine to generate power;

a power battery, the first electrical machine and the second electrical machine being connected to the power battery; and wherein the clutch assembly comprises:

a first engagement member and a second engagement member, the first engagement member being arranged on the main shaft, the second engagement member always being drivingly connected to the electrical machine shaft of the first electrical machine, the first engagement member and the second engagement member being selectively engaged, and the rotor being fastened to the first engagement member.

2. The hybrid powertrain according to claim 1, further comprising a first gear and a second gear, the first gear being connected to the first engagement member, the second gear being connected to the rotor, and the first gear being engaged with the second gear.

3. The hybrid powertrain according to claim 2, wherein the clutch assembly comprises a third engagement member and a fourth engagement member, the third engagement member is drivingly connected to the electrical machine shaft of the first electrical machine, the fourth engagement member is drivingly connected to a differential of the first wheel end, and the third engagement member and the fourth engagement member are selectively engaged.

4. The hybrid powertrain according to claim 2, further comprising a third gear, the third gear being drivingly connected to the electrical machine shaft of the first electrical machine, and the second engagement member being fixedly connected to the third gear.

5. The hybrid powertrain according to claim 2, further comprising a housing, the clutch assembly and the second electrical machine being arranged inside the housing.

6. The hybrid powertrain according to claim 1, further comprising a third gear, the third gear being drivingly connected to the electrical machine shaft of the first electrical machine, and the second engagement member being fixedly connected to the third gear.

7. The hybrid powertrain according to claim 6, further comprising a support shaft, the third gear being fastened to the support shaft and being coaxially arranged with the support shaft, and the first engagement member being rotatably sleeved on the support shaft.

8. The hybrid powertrain according to claim 7, further comprising a housing, the clutch assembly and the second electrical machine being arranged inside the housing.

9. The hybrid powertrain according to claim 7, wherein the clutch assembly comprises a third engagement member and a fourth engagement member, the third engagement member is drivingly connected to the electrical machine shaft of the first electrical machine, the fourth engagement member is drivingly connected to a differential of the first wheel end, and the third engagement member and the fourth engagement member are selectively engaged.

10. The hybrid powertrain according to claim 6, further comprising a housing, the clutch assembly and the second electrical machine being arranged inside the housing.

11. The hybrid powertrain according to claim 6, wherein the clutch assembly comprises a third engagement member and a fourth engagement member, the third engagement member is drivingly connected to the electrical machine shaft of the first electrical machine, the fourth engagement member is drivingly connected to a differential of the first wheel end, and the third engagement member and the fourth engagement member are selectively engaged.

12. The hybrid powertrain according to claim 1, further comprising a housing, the clutch assembly and the second electrical machine being arranged inside the housing.

13. The hybrid powertrain according to claim 12, wherein the first engagement member is rotatably sleeved on the support shaft through a first bearing, and the support shaft is rotatably connected to the housing through a second bearing.

14. The hybrid powertrain according to claim 1, wherein the clutch assembly comprises a third engagement member and a fourth engagement member, the third engagement member is drivingly connected to the electrical machine shaft of the first electrical machine, the fourth engagement member is drivingly connected to a differential of the first wheel end, and the third engagement member and the fourth engagement member are selectively engaged.

15. The hybrid powertrain according to claim 14, further comprising a fifth gear, the fifth gear being fixedly connected to the fourth engagement member, and the fifth gear being connected to an input end of the differential.

16. The hybrid powertrain according to claim 14, further comprising a fifth gear and a sixth gear, the fifth gear being fixedly connected to the fourth engagement member, the sixth gear being connected to the input end of the differential, the fifth gear being engaged with the sixth gear, and the sixth gear being a reverse gear.

17. The hybrid powertrain according to claim 14, wherein the first engagement member and the third engagement member are fixedly connected or integrally formed.

18. The hybrid powertrain according to claim 1, further comprising a third electrical machine, the third electrical machine being connected to the power battery, and the third electrical machine being configured to output power to a second wheel end.

19. A vehicle, comprising the hybrid powertrain according to claim 1.

* * * * *